(12) United States Patent
Sato

(10) Patent No.: US 10,084,928 B2
(45) Date of Patent: *Sep. 25, 2018

(54) IMAGE FORMING APPARATUS AND NON-TRANSITORY COMPUTER READABLE MEDIUM

(71) Applicant: FUJI XEROX CO., LTD., Tokyo (JP)

(72) Inventor: Yusuke Sato, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/848,678

(22) Filed: Dec. 20, 2017

(65) Prior Publication Data

US 2018/0115658 A1    Apr. 26, 2018

Related U.S. Application Data

(63) Continuation of application No. 15/248,343, filed on Aug. 26, 2016, now Pat. No. 9,883,054.

(30) Foreign Application Priority Data

Mar. 25, 2016   (JP) ................................. 2016-062749

(51) Int. Cl.
*H04N 1/00* (2006.01)
*G06F 3/12* (2006.01)

(52) U.S. Cl.
CPC ....... *H04N 1/00214* (2013.01); *G06F 3/1203* (2013.01); *G06F 3/1236* (2013.01); *H04N 1/00244* (2013.01); *H04N 1/00411* (2013.01); *H04N 2201/0094* (2013.01)

(58) Field of Classification Search
CPC .. H04L 63/08; H04L 63/0428; G06F 21/6209
See application file for complete search history.

(56) References Cited

U.S. PATENT DOCUMENTS

| | | | |
|---|---|---|---|
| 2010/0073713 A1 | 3/2010 | Chae | |
| 2010/0306236 A1* | 12/2010 | Cychosz | G06F 17/30082 707/769 |
| 2012/0327482 A1* | 12/2012 | Takishima | H04N 1/00912 358/402 |
| 2014/0067883 A1* | 3/2014 | Fujita | G06F 17/30123 707/821 |

FOREIGN PATENT DOCUMENTS

JP    H09-247347 A    9/1997

OTHER PUBLICATIONS

Feb. 27, 2017 Office Action Issued in U.S Appl. No. 15/248,343.
Mar. 23, 2017 Office Action Issued in U.S Appl. No. 15/248,343.

* cited by examiner

*Primary Examiner* — Kent Yip
(74) *Attorney, Agent, or Firm* — Oliff PLC

(57) ABSTRACT

There is provided an image forming apparatus. A transfer controller is capable of transferring an original document image read from an original document to a plurality of transfer destinations. A management unit manages the transfer controller in such a manner that after the original document image is transferred to one of the plurality of transfer destinations, the original document image is transferred to another transfer destination. The transfer controller reflects a result of transfer to the one transfer destination when transferring the original document image to the other transfer destination.

4 Claims, 5 Drawing Sheets

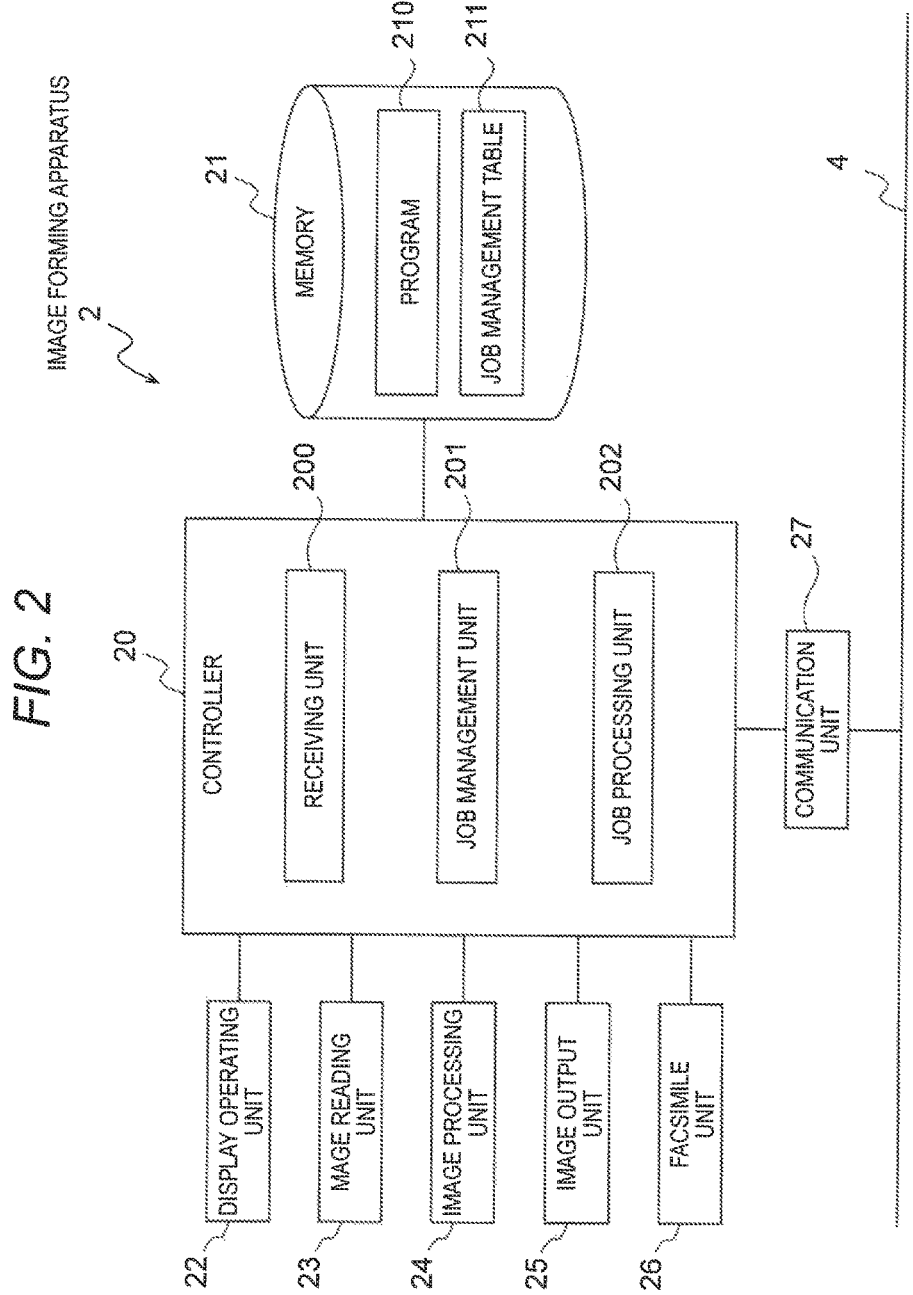

FIG. 3

JOB MANAGEMENT TABLE
211

| JOB ID | JOB NAME | MAIN TRANSFER JOB ID | IMAGE DATA | FILE NAME | TRANSFER DESTINATION | PROCESS RESULT |
|---|---|---|---|---|---|---|
| 100 | COOPERATIVE JOB | | — | — | | |
| 101 | SCAN JOB | | Data_1 | Scan.xdw | — | |
| 102 | MAIN TRANSFER JOB | | Data_1 | Scan_001.xdw | SERVER APPARATUS 3A | Scan.xdw PREVIOUSLY EXISTS. Scan.xdw IS CHANGED TO Scan_001.xdw. |
| 103 | SUB-TRANSFER JOB | 102 | Data_1 | Scan_001.xdw | SERVER APPARATUS 3B | |
| 104 | SUB-TRANSFER JOB | 102 | Data_1 | Scan.xdw | SERVER APPARATUS 3C | Scan_001.xdw PREVIOUSLY EXISTS. |

IMAGE FORMING APPARATUS AND NON-TRANSITORY COMPUTER READABLE MEDIUM

CROSS-REFERENCE TO RELATED APPLICATIONS

This application is a continuation of U.S. patent application Ser. No. 15/248,343 filed on Aug. 26, 2016, which in turn is based on and claims priority under 35 USC 119 from Japanese Patent Application No. 2016-062749 filed Mar. 25, 2016.

TECHNICAL FIELD

The present invention relates to an image forming apparatus and a non-transitory computer readable medium storing a program.

SUMMARY

According to an aspect of the invention, there is provided an image forming apparatus including: a transfer controller that is capable of transferring an original document image read from an original document to plural transfer destinations; and a management unit that manages the transfer controller in such a manner that after the original document image is transferred to one of the plural transfer destinations, the original document image is transferred to another transfer destination, wherein the transfer controller reflects a result of transfer to the one transfer destination when transferring the original document image to the other transfer destination.

BRIEF DESCRIPTION OF THE DRAWINGS

Exemplary embodiments of the present invention will be described in detailed based on the following figures, wherein:

FIG. 2 is a block diagram illustrating a schematic configuration example of an image forming apparatus;

FIG. 3 is a diagram illustrating one example of a job management table;

DETAILED DESCRIPTION

Hereinafter, an exemplary embodiment of the present invention will be described with reference to the drawings. Constituents substantially having the same function will be designated by the same reference signs in each drawing, and duplicate descriptions thereof will be omitted.

Figure 1:
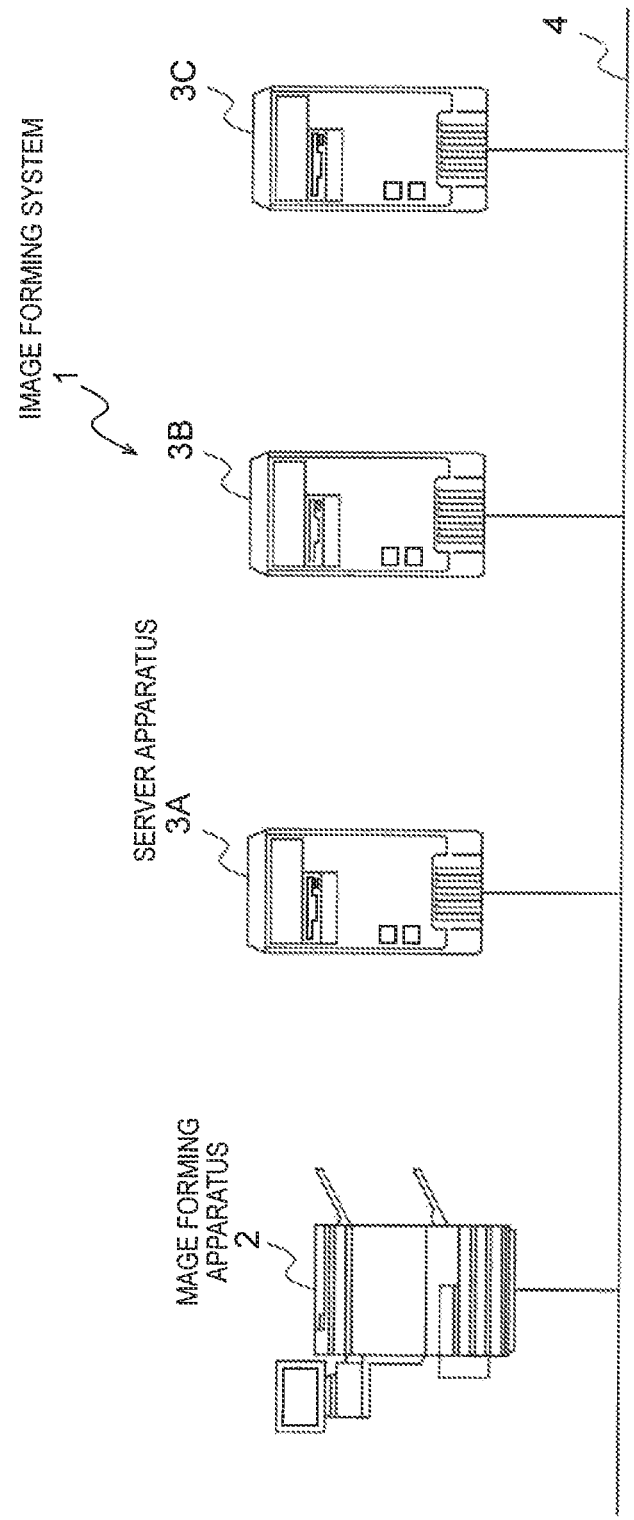
FIG. 1 is a block diagram illustrating a schematic configuration example of an image forming system according to an exemplary embodiment of the present invention.

FIG. 1 is a diagram illustrating a schematic configuration example of an image forming system according to the exemplary embodiment of the present invention. In an image forming system 1, an image forming apparatus 2, multiple server apparatuses 3A, 3B, and 3C (collectively referred to as a "server apparatus 3"), multiple terminal devices not illustrated, and another image forming apparatus are connected to each other through a network 4.

The image forming apparatus 2, for example, transfers an original document image read from an original document to the multiple server apparatus 3. The server apparatus 3 is one example of a transfer destination. The transfer destination is not limited to a server apparatus and may be a terminal device or another image forming apparatus.

The server apparatus 3 stores the original document image, which is transferred from the image forming apparatus 2 through the network 4, in a memory. The server apparatus 3A is, for example, an SMB server, and the server apparatus 3B and the server apparatus 3C are, for example, FTP servers.

The server apparatus 3 includes a controller that is configured with a central processing unit (CPU), an interface, and the like and controls each unit of the server apparatus 3, the memory that is configured with a read-only memory (ROM), a random access memory (RAM), a hard disk, and the like, an input unit that is configured with a keyboard, a mouse, and the like, a display that is configured with a liquid crystal display and the like, and a communication unit that is connected to the network 4.

The network 4 is a communication network such as a local area network (LAN), the Internet, or the like in which data is sent and received by wired communication, wireless communication, and the like.

FIG. 2 is a block diagram illustrating a schematic configuration example of the image forming apparatus 2. The image forming apparatus 2 is a multifunction machine having multiple functions of, for example, copying, scanning, printing, and faxing and includes a controller 20 that controls each unit of the image forming apparatus 2. A memory 21, a display operating unit 22, an image reading unit 23, an image processing unit 24, an image output unit 25, a facsimile unit 26, and a communication unit 27 are connected to the controller 20.

The memory 21 is realized by a read-only memory (ROM), a random access memory (RAM), a hard disk, and the like and stores a program 210, a job management table 211, and the like.

The display operating unit 22 includes a touch panel display configured by disposing a touch panel in an overlying manner on a display such as a liquid crystal display. The display displays an operating screen, and an operator operates the touch panel.

The image reading unit 23 reads an original document image from an original document, includes an automatic document feeder provided on a document stand and a scanner, and reads and inputs an original document image from an original document disposed on the document stand or an original document transported by the automatic document feeder. The image processing unit 24 performs image processing such as compression, expansion, compositing, and the like of images. The image output unit 25 includes, for example, an image carrier provided by a photoconductor and forms and outputs images on a recording medium such as sheet. The facsimile unit 26 modulates and demodulates data in accordance with a facsimile protocol such as G3 and G4 and performs facsimile communication through a telephone line.

The controller 20 is configured with a central processing unit (CPU), an interface, and the like. The CPU is operated in accordance with the program 210 stored in the memory 21 and thereby functions as a receiving unit 200, a job management unit 201, a job processing unit 202, and the like. The job processing unit 202 is one example of a transfer controller.

The receiving unit 200 receives a job from the display operating unit 22 or a terminal device, not illustrated, through the communication unit 27 and passes the job to the job management unit 201.

Types of jobs include a cooperative job that executes a series of processes (jobs). The cooperative job is configured with, for example, a scan job that reads an original document image from an original document, a main transfer job that transfers the original document image to one of multiple (at least two) specified transfer destinations, and one or two or more sub-transfer jobs that transfer the original document image to another transfer destination at the same time. A sub-transfer destination may be one or multiple in number. A main transfer destination is one example of one transfer destination, and a sub-transfer destination is one example of another transfer destination. A sub-transfer destination functions as backup.

The job management unit 201, when a job is passed from the receiving unit 200, issues a job ID and registers the job ID and the job name in the job management table 211. The job management unit 201, in a case where the job is a cooperative job, manages the job processing unit 202 in such a manner that the main transfer job is executed after the scan job is executed and that then one or two or more sub-transfer jobs are executed at the same time. The job management unit 201, in a case where the job is a cooperative job, assigns a job ID to each of the cooperative job, the scan job, the main transfer job, and the sub-transfer job. A job ID is assigned to each sub-transfer job in a case where the sub-transfer job is multiple in number.

The job processing unit 202 is configured to be capable of transferring an original document image read from an original document to multiple transfer destinations at the same time. The job processing unit 202, when transferring the original document image to a sub-transfer destination, reflects the result of transfer to a main transfer destination on transfer to the sub-transfer destination.

That is, the job processing unit 202 changes the file name of the original document image and transfers the original document image to the main transfer destination when there exists, in the main transfer destination, the same file name as the file name of the original document image to be transferred to the main transfer destination, and uses the post-change file name of the original document image as the file name of the original document image when transferring the original document image to the sub-transfer destination. When the same file name as the post-change file name exists in the sub-transfer destination in a case of transfer of the original document image to the sub-transfer destination using the post-change file name, the job processing unit 202 may indicate such a state by display on the display operating unit 22. The job processing unit 202 splits the original document image to be transferred to the sub-transfer destination into multiple pieces and transfers the original document image when the original document image is split into multiple pieces and is transferred to the main transfer destination. The manner of reflecting the result of transfer to the main transfer destination when transferring the original document image to the sub-transfer destination at the same time is not limited to the above case.

A part or the entirety of each of the receiving unit 200, the job management unit 201, and the job processing unit 202 may he configured by hardware such as a field-programmable gate array (FPGA) and an application-specific integrated circuit (ASIC).

(Operation of Image Forming System)

Figure 4:
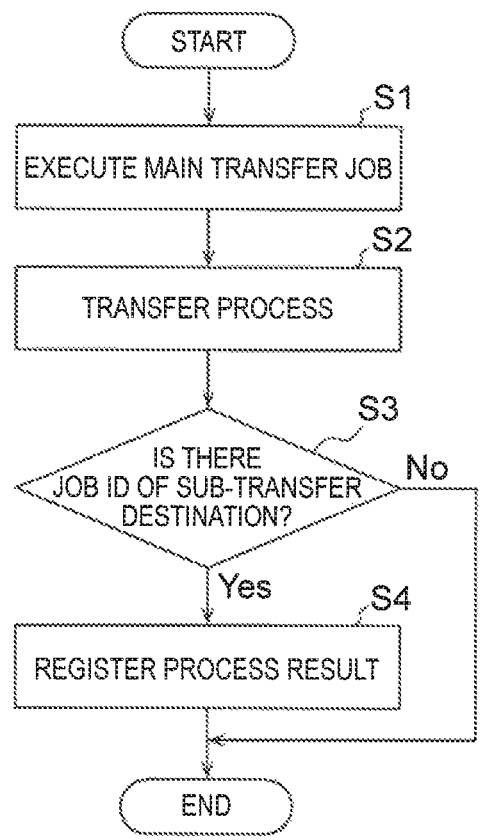
FIG. 4 is a diagram illustrating one example of the flow of a main transfer job.
Figure 5:
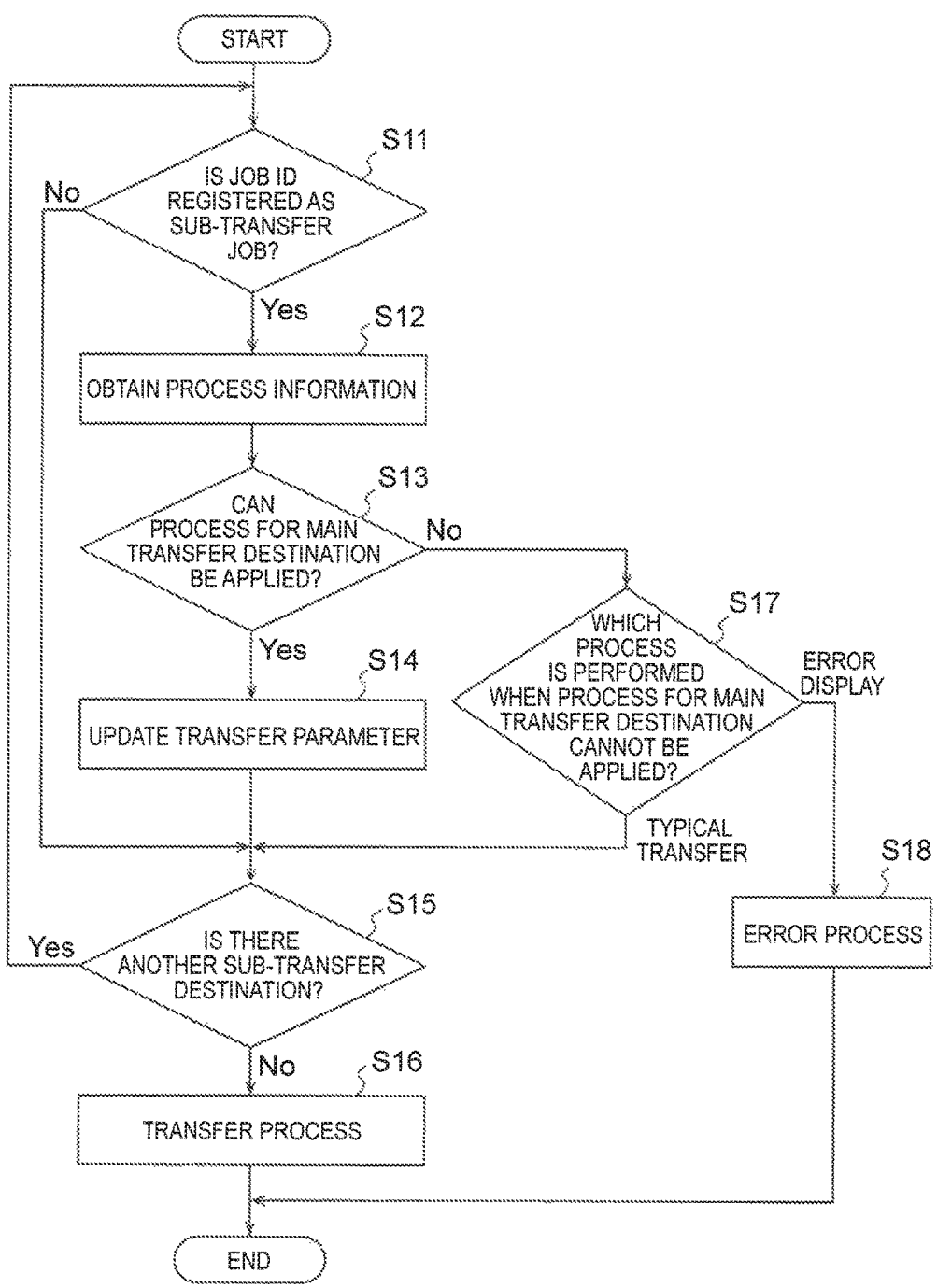
FIG. 5 is a diagram illustrating one example of the flow of a sub-transfer job.

One example of operation of the image forming system 1 according to the present exemplary embodiment will be described with reference to FIG. 3 to FIG. 5. FIG. 3 is a diagram illustrating one example of a job management table. FIG. 4 is a diagram illustrating one example of the flow of a main transfer job. FIG. 5 is a diagram illustrating one example of the flow of a sub-transfer job.

(1) Setting and the Like

A user, for example, disposes an original document on a document stand of the image forming apparatus 2 or an original document feed tray of the automatic document feeder and operates the display operating unit 22 to display a menu screen. The user, for example, selects a cooperative job from the menu screen.

Next, the user operates the display operating unit 22 to display a setting screen. The user specifies one main transfer destination and one or two or more sub-transfer destinations on the setting screen. Assume that the server apparatus 3A is specified as a main transfer destination and that the server apparatus 3B and the server apparatus 3C are specified as sub-transfer destinations. In this case, an original document image is transferred to the main transfer destination by using the SMB protocol and is transferred to two sub-transfer destinations by using the file transfer protocol (FTP).

The user sets scan parameters for each of the main transfer destination and the sub-transfer destinations on the setting screen. Scan parameters set for the main transfer destination include a file format, a read resolution, a color/black-and-white setting, a read size, and the like of the original document image as in a typical scan. Scan parameters for the sub-transfer destinations are the same as the parameters for the main transfer destination except for the read resolution.

The user selects a start button on the setting screen to provide an execution initiation instruction for the cooperative job after the user finishes setting on the setting screen. The receiving unit 200 receives the cooperative job from the display operating unit 22 and passes the cooperative job to the job management unit 201.

The job management unit 201 issues a job ID for each of the scan job, the main transfer job, and the sub-transfer jobs on the basis of the cooperative job passed from the receiving unit 200 and registers the job ID, the job name, and the transfer destination in the job management table 211 At this point, the job ID of the main transfer job is registered for the sub-transfer jobs as well.

The job management unit 201 assigns job IDs "100", "101", "102", "103", and "104" to the cooperative job, the scan job, the main transfer job, and the two sub-transfer jobs in this order since the received job is a cooperative job with two sub-transfer destinations.

The job management unit 201, since the received job is a cooperative job, manages the order of job execution in such a manner that the main transfer job is executed after the scan job is executed and that then the sub-transfer jobs are executed at the same time.

(2) Scan Job

The job processing unit 202 executes the scan job that causes the image reading unit 23 to read an original document image from an original document disposed on the document stand or an original document transported by the automatic document feeder.

The job processing unit 202 registers the original document image, which is obtained by the scan job, in the job management table 211. At this point, a file name auto generation function of the job processing unit 202 generates a file name "Scan.xdw", and the job processing unit 202 registers the file name in the job management table 211. A file name includes, for example, a file name main body (for example, "Scan") that specifies a file, and an extension (for example, "xdw") that indicates a file format. A file name may include an identifier (for example, "001") in order to be identified from other files. The file name main body or the identifier may be input by the user from the display operating unit 22.

(3) Main Transfer Job (Refer to FIG. 4)

The job processing unit 202 executes the main transfer job (S1). That is, the job processing unit 202 transfers image data Data_1 having a file name "Scan.xdw" to the server apparatus 3A through the communication unit 27 and the network 4 (S2).

At this point, the job processing unit 202 obtains the file name of another original document image that is previously stored in the server apparatus 3A of the main transfer destination. Assume that the obtained file name of previously stored another original document image is "Scan.xdw". When the obtained file name "Scan.xdw" is compared with the file name "Scan.xdw" of the original document image to be transferred, both are the same, and thus the file name of the original document image is changed. At this point, either an identifier is added between the file name main body and the extension or an identifier is changed. For example, an identifier "001" is added to form "Scan_001.xdw".

The job processing unit 202 transfers the original document image having a changed file name "Scan_001.xdw" to the server apparatus 3A (S2).

Next, the job processing unit 202 references the job management table 211 to determine whether or not a sub-transfer destination is registered (S3).

The job processing unit 202, since sub-transfer destinations are registered. (Yes in S3), registers the content of a process performed when transferring the original document image to the server apparatus 3A as a process result in the job management table 211 (S4). For example, registered is "Scan.xdw previously exists. Scan.xdw is changed to Scan_001.xdw.".

(4) Sub-Transfer Job

Next, the job processing unit 202 references the job management table 211 to determine whether or not a job ID "103" is registered as a sub-transfer job in the job management table 211 (S11).

The process result related to the main transfer job is obtained (S12) since the job ID "103" is registered as a sub-transfer job in the present exemplary embodiment (Yes in S11).

A determination as to whether or not the process performed for the main transfer destination can be applied to the sub-transfer destination is performed (S13). Specifically, a determination as to whether or not the same file name as the file name changed for the main transfer destination is stored in the sub-transfer destination is performed.

The process is determined to be applicable (Yes in S13) since the same file name does not exist in the server apparatus 3B of the sub-transfer destination, and a transfer parameter is updated (S14). That is, the file name is changed from "Scan.xdw" to "Scan_001.xdw".

A determination as to whether or not there is another sub-transfer destination is performed (S15). Since there is another sub-transfer destination in the present exemplary embodiment (Yes in S15); the job processing unit 202 references the job management table 211 to determine whether or not a job ID "104" is registered as a sub-transfer job in the job management table 211 (S11), The process result related to the main transfer job is obtained (S12) since the job ID "104" is registered as a sub-transfer job in the present exemplary embodiment (Yes in S11).

A determination as to whether or not the process performed for the main transfer destination can be applied to the sub-transfer destination. is performed (S13). Specifically, a determination as to whether or not the same file name as the file name changed for the main transfer destination is stored in the sub-transfer destination is performed. Assume that the memory of the server apparatus 3C previously stores an original document image having a file name "Scan_001.xdw".

The process is determined to be inapplicable (No in S13) since the same file name exists in the server apparatus 3C of the sub-transfer destination, When settings are made to perform a typical transfer as a process that is performed when the process for the main transfer destination cannot be applied, a transfer process is performed without change of the file name (S16). When settings are made to display error, an error process is performed (S18). The error process, for example, indicates, by display on the display operating unit 22, that transfer cannot be performed since the same file name is registered. At this point, the user may operate the display operating unit 22 to change the file name that is previously registered.

The job processing unit 202 transfers the original document image having a file name "Scan_001.xdw" to the server apparatus 3B and, when settings are made to perform a typical transfer fix the server apparatus 3C, transfers the original document image having a pre-change file name "Scan.xdw" to the server apparatus 3C (S16).

While either a typical transfer is performed or error is displayed in a case where an original document image having the same file name as the file name "Scan_001.xdw" changed for the main transfer destination, is stored in the server apparatus 3C, the job processing unit 202 may change identification information of the file name of the original document image that is previously stored in the server apparatus 3C to, fix example, "Scan_101.xdw".

(Modification Example 1)

While the above exemplary embodiment is described regarding change of a file name, a file may be split and transferred to a sub-transfer destination in a case where the file is split in the transfer thereof to a main transfer destination. Specifically, in order to transfer an electronic mail in which a message is recorded in the text thereof to the server apparatus 3B as a main transfer destination and to retain a copy of the electronic mail, a sentence of the same message as that transferred to the main transfer destination may be transferred to the server apparatus 3A as a sub-transfer destination. In this case, assume that, for example, the maximum message size in the main transfer destination is 10,240 kB, the text sent by electronic mail includes 10 pages, and the amount of data of each page is 1,000 kB. Since the size of the electronic mail exceeds the maximum message size when transferred as is, the electronic mail is split into two pieces and is transferred to the main transfer destination, and the sentence of the message is split into two pieces and is transferred to the server apparatus 3A of the sub-transfer destination.

(Other Exemplary Embodiments)

Exemplary embodiments of the present invention are not limited to the above exemplary embodiment, and various exemplary embodiment can be implemented to the extent not changing the gist of the present invention. Steps can be, for example, added, deleted, changed, or replaced in the flow of the exemplary embodiment to the extent not changing the gist of the present invention. The program used in the above exemplary embodiment can be provided by being recorded on a computer readable recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a display configured to receive a job by an operation from a user;
a communication unit connected to a plurality of transfer destinations through a network; and
a transfer controller having a hardware processor, the hardware processor being configured to control transferring of an image in such manner that, after the image is transferred to one of the plurality of transfer destinations, the image is transferred to another of the transfer destinations based on a file name of the image,
wherein the hardware processor changes the file name of the image when another image having the same file name exists in the one transfer destination and transfers the image having a post-change file name to the one transfer destination and the other transfer destination.

2. The image processing apparatus according to claim 1, wherein when the same file name as the post-change file name exists in the other transfer destination in a case of transfer of an original document image to the other transfer destination using the post-change file name, the hardware processor causes such a state to be displayed on a screen of the display.

3. The image processing apparatus according to claim 1, wherein the hardware processor splits an original document image to be transferred to the other transfer destination into a plurality of pieces and transfers the original document image to the other transfer destination when the original document image is split into a plurality of pieces and is transferred to the one transfer destination.

4. A non-transitory computer readable medium storing a program causing a computer comprising (i) a display configured to receive a job by an operation from a user and (ii) a communication unit connected to a plurality of transfer destinations through a network, to function as:
a transfer controller having a hardware processor, the hardware processor being configured to control transferring of an image in such manner that, after the image is transferred to one of the plurality of transfer destinations, the image is transferred to another of the transfer destinations based on a file name of the image,
wherein the hardware processor changes the file name of the image when another image having the same file name exists in the one transfer destination and transfers the image having a post-change file name to the one transfer destination and the other transfer destination.

* * * * *